(12) United States Patent
Furukawa et al.

(10) Patent No.: US 8,261,725 B2
(45) Date of Patent: Sep. 11, 2012

(54) LOW PRESSURE EGR APPARATUS

(75) Inventors: Akira Furukawa, Kariya (JP); Osamu Shimane, Kariya (JP); Shinsuke Miyazaki, Chiryu (JP); Yuichiro Moritani, Kariya (JP)

(73) Assignee: Denso Corporation, Kariya (JP)

( * ) Notice: Subject to any disclaimer, the term of this patent is extended or adjusted under 35 U.S.C. 154(b) by 324 days.

(21) Appl. No.: 12/707,900

(22) Filed: Feb. 18, 2010

(65) Prior Publication Data

US 2010/0206274 A1 Aug. 19, 2010

(30) Foreign Application Priority Data

Feb. 18, 2009 (JP) .................................. 2009-35178

(51) Int. Cl.
*F02B 47/08* (2006.01)
*F02B 47/00* (2006.01)
(52) U.S. Cl. .............................. 123/568.19; 123/568.17
(58) Field of Classification Search ............. 123/568.19, 123/568.17, 568.2, 568.21, 559.1, 316; 701/108; 60/605.1, 605.2

See application file for complete search history.

(56) References Cited

U.S. PATENT DOCUMENTS

| | | | | |
|---|---|---|---|---|
| 2,354,179 A | * | 7/1944 | Blank | ....................... 123/568.17 |
| 4,224,912 A | * | 9/1980 | Tanaka | ....................... 123/568.19 |
| 4,924,840 A | * | 5/1990 | Wade | ....................... 123/568.19 |
| 5,056,309 A | * | 10/1991 | Linder et al. | ..................... 60/278 |
| 5,265,578 A | * | 11/1993 | Zabeck et al. | ........... 123/568.19 |
| 5,562,085 A | | 10/1996 | Kosuda et al. | |
| 6,105,559 A | * | 8/2000 | Stoltman | .................. 123/568.19 |
| 6,925,992 B1 | | 8/2005 | Eriksson et al. | |
| 7,237,531 B2 | * | 7/2007 | Atkinson | ....................... 123/399 |
| 7,267,139 B2 | * | 9/2007 | Blomquist et al. | ............ 137/607 |
| 2005/0145229 A1 | | 7/2005 | Eriksson et al. | |
| 2005/0145230 A1 | | 7/2005 | Eriksson et al. | |
| 2007/0074708 A1 | | 4/2007 | Amano et al. | |
| 2008/0141671 A1 | | 6/2008 | Takemoto | |

FOREIGN PATENT DOCUMENTS

| | | |
|---|---|---|
| JP | 7-332119 | 12/1995 |
| JP | 2002-529653 | 9/2002 |
| JP | 2007-092664 | 4/2007 |
| JP | 2007-132305 | 5/2007 |
| JP | 2008-150955 | 7/2008 |

OTHER PUBLICATIONS

Japanese Office Action dated Dec. 21, 2010 issued in corresponding Japanese Application No. 2009-035178 with English Translation.

* cited by examiner

*Primary Examiner* — Mahmoud Gimie
(74) *Attorney, Agent, or Firm* — Nixon & Vanderhye PC

(57) ABSTRACT

A converting mechanism is provided between an EGR control valve driven by an actuator and an intake-air valve for generating negative pressure, so that the intake-air valve is also driven by the actuator. The converting mechanism has a cam plate rotated together with the EGR control valve and an arm rotated together with the intake-air valve. A cam groove formed in the cam plate is engaged with a driving pin of the arm. The intake-air valve is held at its maximum valve opening position, when the EGR control valve is rotated in a first angular range, while the intake-air valve is rotated from the valve opening position to a maximum valve closing position when the EGR control valve is rotated in a second angular range.

4 Claims, 13 Drawing Sheets

LOW PRESSURE EGR APPARATUS

CROSS REFERENCE TO RELATED APPLICATION

This application is based on Japanese Patent Application No. 2009-035178 filed on Feb. 18, 2009, the disclosure of which is incorporated herein by reference.

FIELD OF THE INVENTION

The present invention relates to a low pressure EGR apparatus for re-circulating a part of exhaust gas discharged from an engine (an internal combustion engine for producing driving power by combusting fuel) into a low negative pressure portion of an intake-air passage (for example, an upstream side of a throttle valve, at which small negative pressure is generated).

BACKGROUND OF THE INVENTION

A prior art of the present invention will be explained with reference to FIGS. 13 and 14. Reference numerals used in FIGS. 13 and 14 correspond to those used for explaining embodiments of the present invention.

A high pressure EGR apparatus 31 is known in the art as a technology for suppressing generation of nitrogen oxides (NOx) contained in exhaust gas of an engine 2. The high pressure EGR apparatus 31 will be explained with reference to FIG. 13.

The high pressure EGR apparatus 31 is generally called as an EGR apparatus, according to which a part of exhaust gas is re-circulated as EGR gas into an intake-air passage at a downstream side of a throttle valve 26 (that is, a high negative pressure portion). The EGR gas is mixed as un-combustible gas to intake air to suppress temperature increase in combustion chambers of the engine, so as to effectively suppress generation of NOx.

According to the high pressure EGR apparatus 31, a high pressure EGR control valve 33 is provided in a high pressure EGR passage 32 for re-circulating the EGR gas into an intake-air side, in order to control an opening degree of the high pressure EGR passage 32. The opening degree of the high pressure EGR control valve 33 is controlled by ECU (Engine Control Unit) so as to obtain such EGR amount (re-circulated amount of the exhaust gas per unit time) corresponding to an operational condition of the engine 2 (such as, engine rotational speed, engine load, and so on).

It is always required for the engine 2 to further reduce generation of NOx.

Recently, it is proposed, as disclosed in Japanese Patent Publication No. 2008-150955, to provide a low pressure EGR apparatus 1 in addition to the high pressure EGR apparatus 31 for the purpose of further reducing the generation of NOx. The low pressure EGR apparatus 1 will be explained with reference to FIG. 14.

The low pressure EGR apparatus 1 re-circulates a part of exhaust gas from a low pressure portion of an exhaust gas passage (a portion at which exhaust gas pressure is low, such as a downstream side of a DPF 29) to a low negative pressure portion of an intake-air passage 3 (a portion at which negative pressure for intake-air is low, such as an upstream side of a throttle valve 26). According to the low pressure EGR apparatus 1, a smaller amount of EGR gas is re-circulated to the engine 2.

More exactly, in the low pressure EGR apparatus 1 for a vehicle having a turbo-charger, a part of the exhaust gas on a downstream side of the exhaust gas passage 22 (that is, at a downstream side of an exhaust-gas turbine 28) is re-circulated to an upstream side of the intake-air passage 3 (that is, at an upstream side of a compressor 24). In other words, the exhaust gas in the low pressure portion of the exhaust gas passage 22 is re-circulated to the low negative pressure portion of the intake-air passage 3. As a result, it is possible that the smaller amount of EGR gas is re-circulated to the engine 2.

In an engine operating condition, for example, in an engine operating condition of high engine load, low density of EGR gas is required. It is, however, not possible to achieve such low density of EGR gas with the high pressure EGR apparatus 31. On the other hand, the low pressure EGR apparatus 1 can realize the low density of EGR gas so that generation of NOx can be more effectively suppressed in a wider engine operating range.

According to the low pressure EGR apparatus 1, a low pressure EGR control valve 5 is provided in a low pressure EGR passage 4 for re-circulating the EGR gas into the intake-air side, in order to control an opening degree of the low pressure EGR passage 4. In the same manner to the high pressure EGR control valve 33, the opening degree of the low, pressure EGR control valve 5 is controlled by the ECU so as to obtain such EGR amount corresponding to the operating condition of the engine 2 (such as, engine rotational speed, engine load, and so on).

As explained above, the low pressure EGR apparatus 1 re-circulates the exhaust gas in the low pressure portion of the exhaust gas passage 22 to the low negative pressure portion of the intake-air passage 3.

It is, therefore, on one hand possible for the low pressure EGR apparatus 1 to re-circulate small amount of the EGR gas into the engine 2. On the other hand, it is difficult for the low pressure EGR apparatus 1 to re-circulate large amount of the EGR gas into the engine 2. In other words, the low pressure EGR apparatus 1 can not meet a requirement for re-circulating the large amount of the EGR gas into the engine 2, even when there is such requirement in an engine operating condition.

According to a prior art, in view of the above problem, it is also proposed to provide an intake-air valve 6 (a negative pressure generating valve) at a portion of the intake-air passage 3, at which the EGR gas is re-circulated into the intake-air side by the low pressure EGR apparatus 1. In such an engine operating condition, in which large amount of EGR gas is required to be re-circulated to the engine 2, the intake-air valve 6 is operated in a valve closing direction so as to generate negative pressure. Namely, in the engine operating condition that re-circulation of the large amount of EGR gas by the low pressure EGR apparatus 1 is necessary, the negative pressure is generated by the intake-air valve 6 to re-circulate the large amount of EGR gas to the engine 2.

As already explained above, the opening degree of the low pressure EGR control valve 5 is controlled by the ECU depending on the engine rotational speed, the engine load, and so on.

On the other hand, the intake-air valve 6 is operated by the ECU to rotate in the valve closing direction only when the re-circulation of the large amount of EGR gas is required.

As above, the low pressure EGR control valve 5 and the intake-air valve 6 are respectively controlled depending on different operating conditions of the engine. Namely, the low pressure EGR control valve 5 and the intake-air valve 6 are independently operated from each other.

It is, therefore, necessary to provide not only an actuator J1 for driving the low pressure EGR control valve 5 but also another actuator J2 for driving the intake-air valve 6, which would cause increases in cost, in size, and in weight of the EGR apparatus.

Therefore, there is a demand to drive the low pressure EGR control valve 5 and the intake-air valve 6 by one actuator (for example, as disclosed in Japanese Patent Publications No. 2007-132305 or No. 2007-092664).

When the low pressure EGR control valve 5 and the intake-air valve 6 are simply driven by one actuator, both of the valves 5 and 6 are rotated together. It is not possible to obtain valve operating characteristics required for the respective valves.

Accordingly, according to the prior art, the actuator J1 for the low pressure EGR control valve 5 and the actuator J2 for the intake-air valve 6 are independently provided, even when such two actuators would cause increases in cost, in size, and in weight of the EGR apparatus.

SUMMARY OF THE INVENTION

The present invention is made in view of the above problems. It is an object of the present invention to provide a low pressure EGR apparatus, according to which it is possible with one actuator not only to independently operate both of a low pressure EGR control valve and an intake-air valve, but also to meet both of valve operating characteristic features required for the low pressure EGR control valve and the intake-air valve.

According to a feature of the invention, a low pressure EGR apparatus for an engine has a low pressure EGR passage for re-circulating a part of exhaust gas from the engine into a low negative pressure portion of an intake-air passage of the engine as EGR gas. A low pressure EGR control valve is provided in the low pressure EGR passage for controlling EGR gas amount by adjusting an opening degree of the low pressure EGR control valve. An intake-air valve is provided in the intake-air passage at an upstream side of a connecting portion between the low pressure EGR passage and the intake-air passage, for controlling intake-air amount by adjusting an opening degree of the intake-air valve. An actuator is provided for driving the low pressure EGR control valve. And a link device is provided, which has a converting mechanism for converting an output characteristic of the actuator so that the link device drives the intake-air valve by an output converted through the converting mechanism.

According to the low pressure EGR apparatus, not only the low pressure EGR control valve is operated by the actuator, but also the intake-air valve is operated by the same actuator via the link device, wherein characteristic of the output of the actuator is converted by the converting mechanism.

As a result, it is possible with one actuator,
(a) to rotate the low pressure EGR control valve while holding the maximum valve opening position of the intake-air valve, so that a smaller amount of EGR gas is re-circulated into the engine, and
(b) to rotate the low pressure EGR control valve and the intake-air valve at the same time, so that the larger amount of EGR gas is re-circulated into the engine.

In other words, according to the present invention, it is possible with one actuator to control both of the low pressure EGR control valve and the intake-air valve, and to meet both of the characteristic feature required for the low pressure EGR control valve and the characteristic feature required for the intake-air valve.

Accordingly, it becomes possible to suppress an increase of the cost for the LP EGR apparatus and to realize a small-sized and light-weight EGR apparatus.

BRIEF DESCRIPTION OF THE DRAWINGS

The above and other objects, features and advantages of the present invention will become more apparent from the following detailed description made with reference to the accompanying drawings. In the drawings:

FIG. 10A is a schematic cross-sectional view showing the driving mechanism corresponding to FIG. 1A;

FIG. 10B is an enlarged cross-sectional view of a portion encircled in FIG. 10A;

FIG. 10C is an enlarged cross-sectional view showing a sliding end portion according to a third embodiment of the present invention;

DETAILED DESCRIPTION OF THE PREFERRED EMBODIMENTS

Figure 1A:
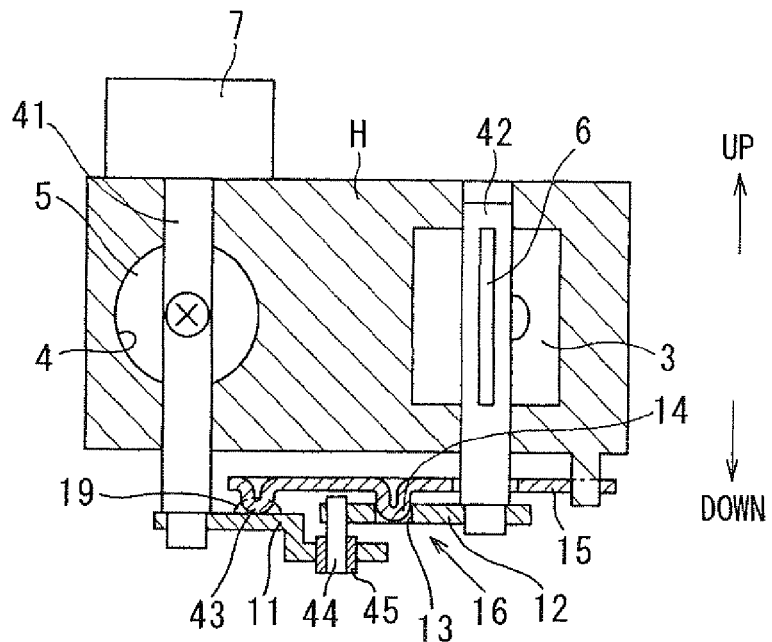
FIG. 1A is a schematic cross-sectional view showing a driving mechanism for a low pressure EGR control valve and an intake-air valve according to a first embodiment of the invention.

An embodiment of the present invention will be explained with reference to FIGS. 1 to 7. The same reference numerals are used for identical or similar parts through multiple embodiments.

Figure 6:
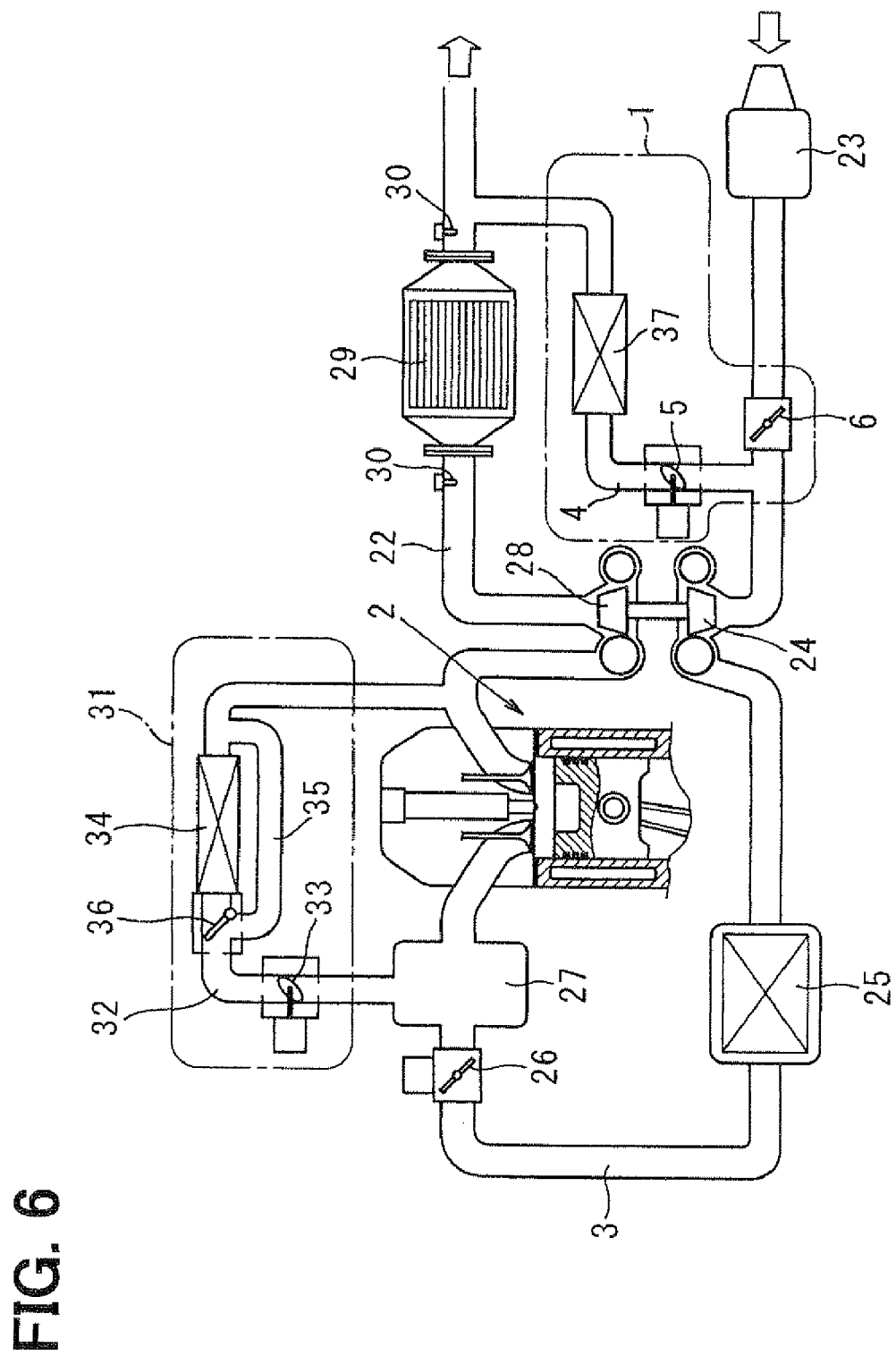
FIG. 6 is a schematic view showing a general structure for an intake and exhaust system for an engine.

As shown in FIG. 6, a low pressure (L-P) EGR apparatus 1 is composed of a low pressure (L-P) EGR passage 4 for re-circulating a part of exhaust gas of an engine 2 into an air-intake side (a low negative pressure portion of an intake-air passage 3) as EGR gas, a low pressure (L-P) EGR control valve 5 for adjusting an opening degree of the L-P EGR passage 4 so as to control flow amount of the EGR gas (EGR amount), and an intake-air valve 6 for controlling an opening degree of the intake-air passage 3 at an upstream portion of a connecting portion between the intake-air passage 3 and the L-P EGR passage 4.

As shown in FIGS. 1A to 3A, the L-P EGR apparatus 1 has an electric actuator 7 (as an example of actuators) for driving the L-P EGR control valve 5, a converting mechanism (a converting device) 8 for converting output characteristic of the electric actuator 7, and a link device 9 for driving the intake-air valve 6 by means of output converted by the converting mechanism 8.

The link device 9 is composed of a cam plate 11 integrally rotatable with the L-P EGR control valve 5, an arm 12 integrally rotatable with the intake-air valve 6, and a lock mechanism 16. The lock mechanism 16 has a lock pin 14 which will be engaged with (inserted into) an aperture 13 formed in the arm 12 when the intake-air valve 6 is held at a position for opening the intake-air passage 3 at its maximum opening degree, and a lever 15 for biasing the lock pin 14 toward the arm 12.

The converting mechanism 8 is composed of a cam groove 17 formed in the cam plate 11 at a distance from a rotational center thereof, and a driving pin 18 provided on the arm 12 at a distance from a rotational center thereof so that the driving pin 18 describes an arc.

Figure 1B:
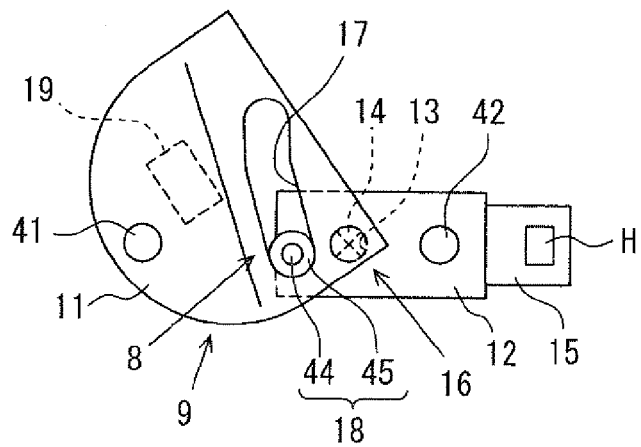
FIG. 1B is a schematic view showing a major portion of the driving mechanism of FIG. 1A, when viewed from a bottom side of FIG. 1A, wherein two valves are respectively in their initial positions.
Figure 1C:
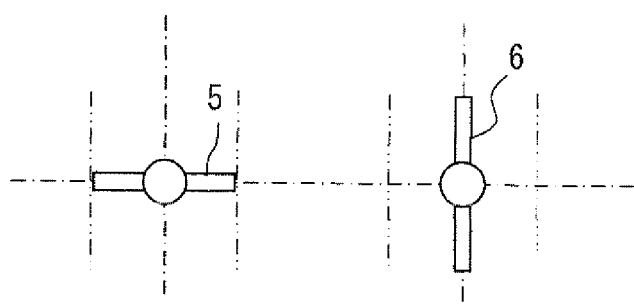
FIG. 1C is a schematic view showing rotating positions of respective valves.
Figure 4:
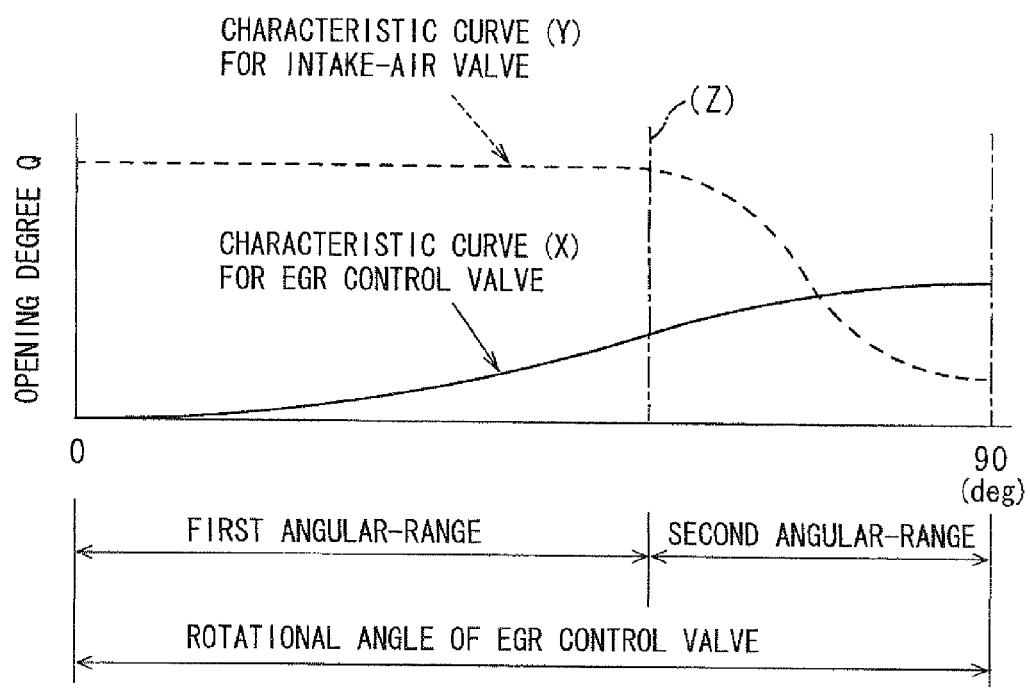
FIG. 4 is a graph showing opening degrees of the low pressure EGR control valve and the intake-air valve with respect to rotational angle of the low pressure EGR control valve.

A cam profile of the cam groove 17 is formed in a following shape. In a first angular range (that is, a range between 0 and Z degree) of the L-P EGR control valve 5, in which the L-P EGR control valve 5 is moved (rotated) from its initial position (a maximum closing position for the L-P EGR passage 4, as shown in FIGS. 1A to 1C) to an intermediate position (a rotational angle Z as shown in FIG. 4 and in FIGS. 2A to 2C), the intake-air valve 6 is held at its initial position, that is a maximum valve opening position for the intake-air passage 3.

Figure 3A:
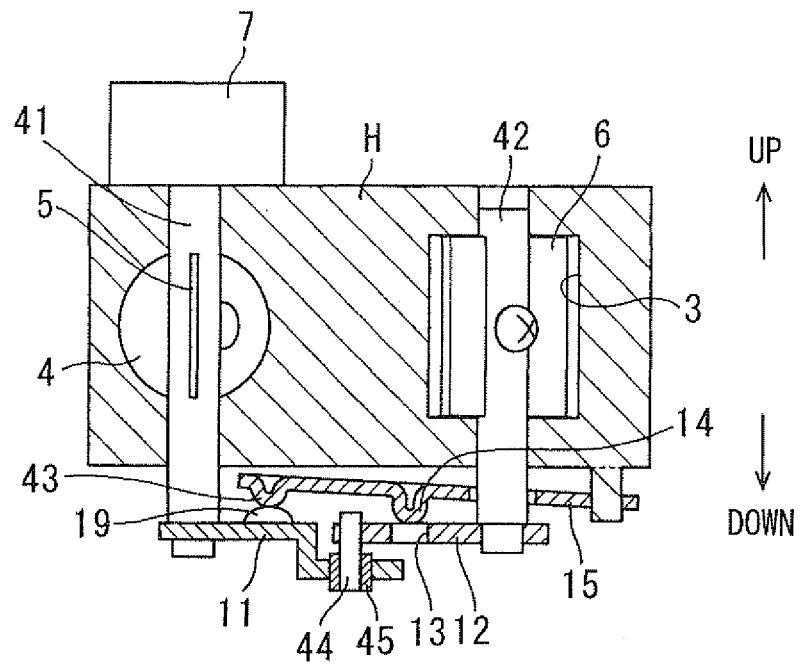
FIGS. 3A to 3C are schematic views similar to those of FIGS. 1A to 1C, wherein the low pressure EGR control valve is further rotated to a maximum valve opening position, and the intake-air valve is rotated together with the rotation of the EGR control valve to its maximum valve closing position.
Figure 3B:
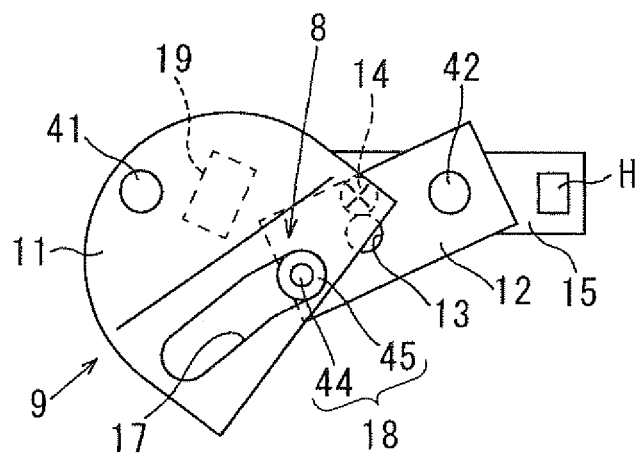
Figure 3C:
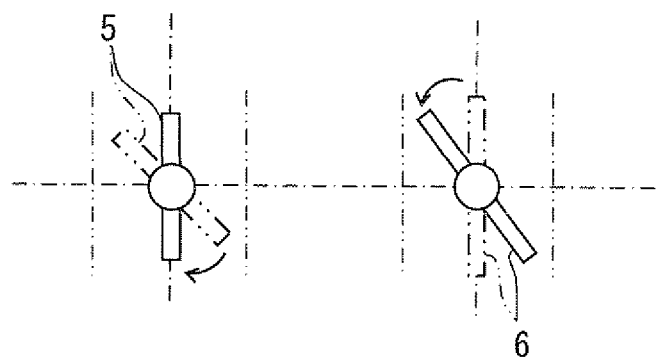

In a second angular range (a range between Z and 90 degrees), in which the L-P EGR control valve 5 is further rotated from the intermediate position (the Z-degree position) to its maximum valve opening position (as shown in FIGS. 3A to 3C), the intake-air valve 6 is rotated from its maximum valve opening position to its maximum valve closing position for the intake-air passage 3, in accordance with the rotation of the L-P EGR control valve 5.

A lever-lift cam 19 is provided on the cam plate 11 so that the lever 15 is lifted up when the L-P EGR control valve 5 is within the second angular range (the range between Z and 90 degrees) to thereby release a locked condition of the lock pin 14. Namely, the lock pin 14 is brought out of the engagement with the aperture 13. The first embodiment will be explained more in detail. An air intake system as well as exhaust gas system of the engine 2 will be explained with reference to FIGS. 6 and 7.

The engine 2 is a diesel engine for driving a vehicle, which has the intake-air passage 3 for supplying intake air into respective cylinders and an exhaust gas passage 22 for discharging exhaust gas generated in the cylinders into the air.

The intake-air passage 3 is composed of passages formed by an intake pipe, an intake manifold and intake ports. The intake pipe is a passage member forming a part of the intake-air passage 3 from an air entering portion to the intake manifold. An air cleaner 23 is provided in the intake pipe for removing dust contained in the intake air to be supplied into the engine 2. In addition, an intake-air sensor (an air-flow sensor) for measuring intake-air amount, a compressor (an intake-air bladed wheel) 24 of a turbo-charger, an inter cooler 25 for forcibly cooling down the intake air (temperature of which is increased by compressing the intake air), and a throttle valve 26 for adjusting the intake-air amount to be supplied into the cylinders and so on are likewise provided in the intake-air pipe.

The intake manifold is an air distributing member for distributing the intake air to be supplied from the intake pipe into the respective cylinders. A surge tank 27 is provided in the intake manifold for preventing pulsation and/or interference of the intake air, which would otherwise adversely affect accuracy of the air-flow sensor. The intake ports are formed in a cylinder head of the engine 2 for supplying the intake air distributed by the intake manifold into the respective cylinders.

The exhaust gas passage 22 is composed of passages formed by exhaust ports, an exhaust manifold, and an exhaust pipe. The exhaust ports are also formed in the cylinder head of the engine 2 for discharging the exhaust gas produced in the cylinders to the exhaust manifold. The exhaust manifold is a gas collecting member for collecting exhaust gas discharged from the respective exhaust ports. And an exhaust gas turbine (an exhaust gas bladed wheel) 28 of the turbo-charger is provided at a connecting portion between an exhaust gas outlet portion of the exhaust manifold and the exhaust pipe. The exhaust pipe is a passage member for emitting the exhaust gas having passed through the exhaust gas turbine 28 into the air. A DPF (Diesel Particulate Filter) 29 is provided in the exhaust pipe for trapping particulates contained in the exhaust gas. In addition, exhaust gas temperature sensors 30 for detecting temperature of the exhaust gas at an upstream side and a downstream side of the DPF 29, a differential pressure sensor (not shown) for detecting a differential pressure between the upstream and the downstream sides of the DPF 29, and so on are provided in the exhaust pipe.

Intake valves and exhaust valves are provided in the cylinder head, in which the intake ports and the exhaust ports are formed, so that each of the intake valves opens and closes each outlet end of the intake port (each boundary portion between the intake port and an inside of the cylinder) and each of the exhaust valves likewise opens and closes each inlet end of the exhaust port (each boundary portion between the exhaust port and the inside of the cylinder).

Each cylinder of the engine 2 repeatedly carries out an intake stroke, a compression stroke, an explosion stroke, and an exhaust stroke. The intake valve is opened at a beginning of the intake stroke (when a cylinder volume is increased in accordance with a downward movement of a piston) and closed at an end of the intake stroke (when an increase of the cylinder volume is terminated as a result of ending the downward movement of the piston). As a result of the above air-intake operation of the engine 2, flow of the intake-air is generated in the intake-air passage 3, wherein the intake-air flows from the air entering portion into the cylinders of the engine 2.

In a similar manner to the above, the exhaust valve is opened at a beginning of the exhaust stroke (when the cylinder volume is decreased in accordance with an upward movement of the piston) and closed at an end of the exhaust stroke (when a decrease of the cylinder volume is terminated as a result of ending the upward movement of the piston). Therefore, flow of the exhaust gas is generated in the exhaust gas passage 22 by the above gas exhausting operation of the engine 2, wherein the exhaust gas flows from the cylinder to a gas emitting portion of the exhaust pipe.

The air-intake and exhaust gas systems of the engine 2, as shown in FIG. 6, have a high pressure (H-P) EGR apparatus 31 in addition to the L-P EGR apparatus 1, to which the present invention is applied.

The H-P EGR apparatus 31 is an exhaust gas re-circulation apparatus having a high pressure (H-P) EGR passage 32, which is connected at its one end to an upstream side of the exhaust gas passage 22 and at the other end to a downstream side of the intake-air passage 3, so that a part of the exhaust gas is re-circulated as EGR gas into the downstream side of the intake-air passage 3. In the H-P EGR apparatus 31, exhaust gas pressure at the upstream side of the exhaust gas passage 22 is higher than that at a downstream side thereof, while negative pressure at the downstream side of the intake-air passage 3 is larger than that at an upstream side thereof, so that a larger amount of the EGR gas can be re-circulated into the cylinders of the engine 2. In the embodiment shown in FIG. 6, the H-P EGR passage 32 is connected to the exhaust manifold for the exhaust gas passage 22 on one hand, and to a surge tank 27 for the intake-air passage 3 on the other hand.

In the H-P EGR passage 32, a high pressure (H-P) EGR control valve 33 is provided for adjusting opening degree of the H-P EGR passage 32 so as to control flow amount of the EGR gas. A high pressure (H-P) EGR cooling device 34 is also provided in the H-P EGR passage 32 for cooling down the EGR gas which is re-circulated into the air-intake side. A bypass passage 35 is provided to the H-P EGR passage 32 in such a way that the EGR gas to be re-circulated to the air-intake side may bypass the H-P EGR cooling device 34. And a switching valve 36 is further provided in the H-P EGR passage 32 for switching over flow of the EGR gas so that the EGR gas may flow either through the H-P EGR cooling device 34 or through the bypass passage 35.

The above H-P EGR control valve 33, the H-P EGR cooling device 34, the bypass passage 35 and the switching valve 36 may be in advance assembled as a high-pressure EGR module, which will be then mounted on a vehicle. The present invention should not be, however, limited to such high-pressure EGR module.

As already explained above, the L-P EGR apparatus 1 is an exhaust gas re-circulation apparatus having the low pressure (L-P) EGR passage 4, which is connected at its one end to the downstream side of the exhaust gas passage 22 and at the other end to the upstream side of the intake-air passage 3, so that another part of the exhaust gas is also re-circulated as EGR gas into the upstream side of the intake-air passage 3.

In the L-P EGR apparatus 1, the exhaust gas pressure at the downstream side of the exhaust gas passage 22 is lower than that at the upstream side thereof, while negative pressure at the upstream side of the intake-air passage 3 is smaller than that at the downstream side thereof, so that a smaller amount of the EGR gas may be likewise re-circulated into the cylinders of the engine 2. In the embodiment shown in FIG. 6, the L-P EGR passage 4 is connected to the exhaust pipe at the downstream side of the DPF 29 on one hand, and to the intake pipe at the upstream side of the compressor 24 for the turbocharger on the other hand.

As explained above, the L-P EGR control valve 5 is provided in the L-P EGR passage 4 for adjusting an opening degree of the L-P EGR passage 4 so as to control flow amount of the EGR gas. And a low pressure (L-P) EGR cooling device 37 is provided in the L-P EGR passage 4 for cooling down the EGR gas to be re-circulated into the air-intake side.

The intake-air valve 6 (that is, a negative pressure generating valve) is provided in the intake pipe at an upstream side of the connecting portion of the L-P EGR passage 4 to the intake pipe, so that negative pressure is generated at the connecting portion of the L-P EGR passage 4. The intake-air valve 6 is so designed that a portion of the intake-air passage 3 (for example, around 10% of the intake-air passage) can be still opened even in a case that the intake-air valve 6 is moved to its maximum valve closing position (As indicated by a dotted line (Y) in FIG. 4).

The above L-P EGR control valve 5, the L-P EGR cooling device 37, and the intake-air valve 6 may be in advance assembled as a low pressure EGR module, which will be then mounted on the vehicle. The present invention should not be, however, limited to such low pressure EGR module.

Each of the H-P EGR cooling device 34 and the L-P EGR cooling device 37 is a gas cooling device of a water-cooling type, in which heat exchange is carried out between engine cooling water for the engine 2 and high-temperature EGR gas so as to cool down the high temperature EGR gas. Therefore, each of those cooling devices 34 and 37 has a heat-exchanger for carrying out the heat exchange between the engine cooling water and the EGR gas.

Opening degrees of the H-P EGR control valve 33 and the switching valve 36 for the H-P EGR apparatus 31 as well as opening degrees of the L-P EGR control valve 5 and the intake-air valve 6 for the L-P EGR apparatus 1 are controlled by an electronic control unit (ECU) (not shown).

The ECU is an engine control electronic device having a well known micro-computer, which is composed of CPU for carrying out control process and calculation process, a memory device (such as ROM, RAM, and so on) for storing various kinds of control programs and data, Input-Output circuits, and so on.

The ECU performs an operational control (including a fuel injection control) for the engine 2, based on the control programs stored in the memory device and various sensor signals (such as, operation signals operated by a vehicle driver, detection signals from various kinds of detection sensors, and so on). An EGR control program for carrying out operational controls for the H-P EGR apparatus 31 and the L-P EGR apparatus 1 is also stored in the memory device of the ECU.

The EGR control program includes a cooling-device switching program, according to which the switching valve 36 is operated based on a warming-up condition of the engine 2 (for example, temperature of the engine cooling water). The EGR control program further includes an EGR amount control program, according to which the opening degrees of the H-P EGR control valve 33, the L-P EGR control valve 5 as well as the opening degree of the intake-air valve 6 are controlled based on engine rotational speed and engine load (that is, engine torque).

An operation of the EGR apparatus will be explained with reference to FIG. 7. According to the EGR amount control program, the EGR operation is controlled as below:

(1) In a case that an engine operating condition is in a range below a dotted line "α" in FIG. 7 (namely, when the engine torque with respect to the engine rotational speed is lower than the dotted line "α"), an operation for the L-P EGR apparatus 1 is stopped so that the EGR operation is carried out only by the opening degree of the H-P EGR control valve 33 of the H-P EGR apparatus 31. More exactly, the L-P EGR passage 4 is closed by the L-P EGR control valve 5, and the opening degree of the H-P EGR control valve 33 is controlled depending on a relationship between the engine rotational speed and the engine torque.

Figure 7:
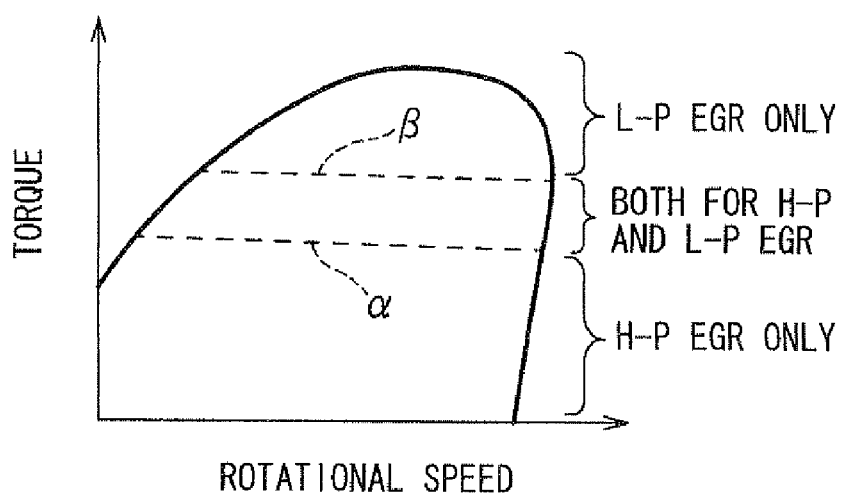
FIG. 7 is a graph showing an EGR operation according to programs for controlling high-pressure and/or low-pressure EGR operation.

(2) In a case that the engine operating condition is in a range between the dotted line "α" and a dotted line "β" in FIG. 7, the EGR operation is carried out by controlling both of the opening degrees of the H-P EGR control valve 33 of the H-P EGR apparatus 31 and the L-P EGR control valve 5 of the L-P EGR apparatus 1. More exactly, the opening degree of the H-P EGR control valve 33 of the H-P EGR apparatus 31 is controlled depending on the relationship between the engine rotational speed and the engine torque, while the opening degree of the L-P EGR control valve 5 as well as the intake-air valve 6 of the L-P EGR apparatus 1 is controlled depending on the relationship between the engine rotational speed and the engine torque.

(3) In a case that the engine operating condition is in a range above the dotted line "β" in FIG. 7, the operation for the H-P EGR apparatus 31 is stopped so that the EGR operation is carried out only by the opening degree of the L-P EGR control valve 5 of the L-P EGR apparatus 1. More exactly, the H-P EGR passage 32 is closed by the H-P EGR control valve 33, and the opening degree of the L-P EGR control valve 5 as well as the intake-air valve 6 is controlled depending on the relationship between the engine rotational speed and the engine torque.

Since the low pressure EGR apparatus re-circulates the exhaust gas from the low pressure portion of the exhaust gas passage to the low negative pressure portion of the intake-air passage, it is preferable for the low pressure EGR apparatus to re-circulate a smaller amount of the EGR gas. In other words, it is rather difficult for the low pressure EGR apparatus (of the prior art) to re-circulate a larger amount of the EGR gas, even when there is an engine operating condition in which it is required for the low pressure EGR apparatus to re-circulate the larger amount of the EGR gas into the engine.

Therefore, according to the low pressure EGR apparatus 1 of the present embodiment, the intake-air valve 6 is provided in the intake-air passage 3 so as to generate negative pressure at such a portion, to which the EGR gas is re-circulated. Then, the intake-air valve 6 is driven to rotate in a valve closing direction (in a direction to generate larger negative pressure) in the engine operating condition, in which the re-circulation of the larger amount of the EGR gas is necessary for the low pressure EGR apparatus. As a result, it also becomes possible for the low pressure EGR apparatus 1 to control the larger amount of the EGR gas to be re-circulated.

The following two conditions are necessary for the intake-air valve 6:

(1) In an operating mode of low EGR density, in which a smaller amount of the EGR gas is re-circulated into the engine 2 via the L-P EGR apparatus 1, the intake-air valve 6 is held at its maximum valve opening position so as not to generate the negative pressure, while the L-P EGR control valve 5 is rotated to adjust its opening position.

(2) In an operating mode of high EGR density, in which a larger amount of the EGR gas is re-circulated into the engine 2 via the L-P EGR apparatus 1, the intake-air valve 6 is rotated in a direction to close the intake-air passage 3 to increase the negative pressure, in accordance with an increase of the opening position of the L-P EGR control valve 5.

As above, the L-P EGR control valve 5 and the intake-air valve 6 are respectively operated depending on independent engine operating conditions.

Figure 14:
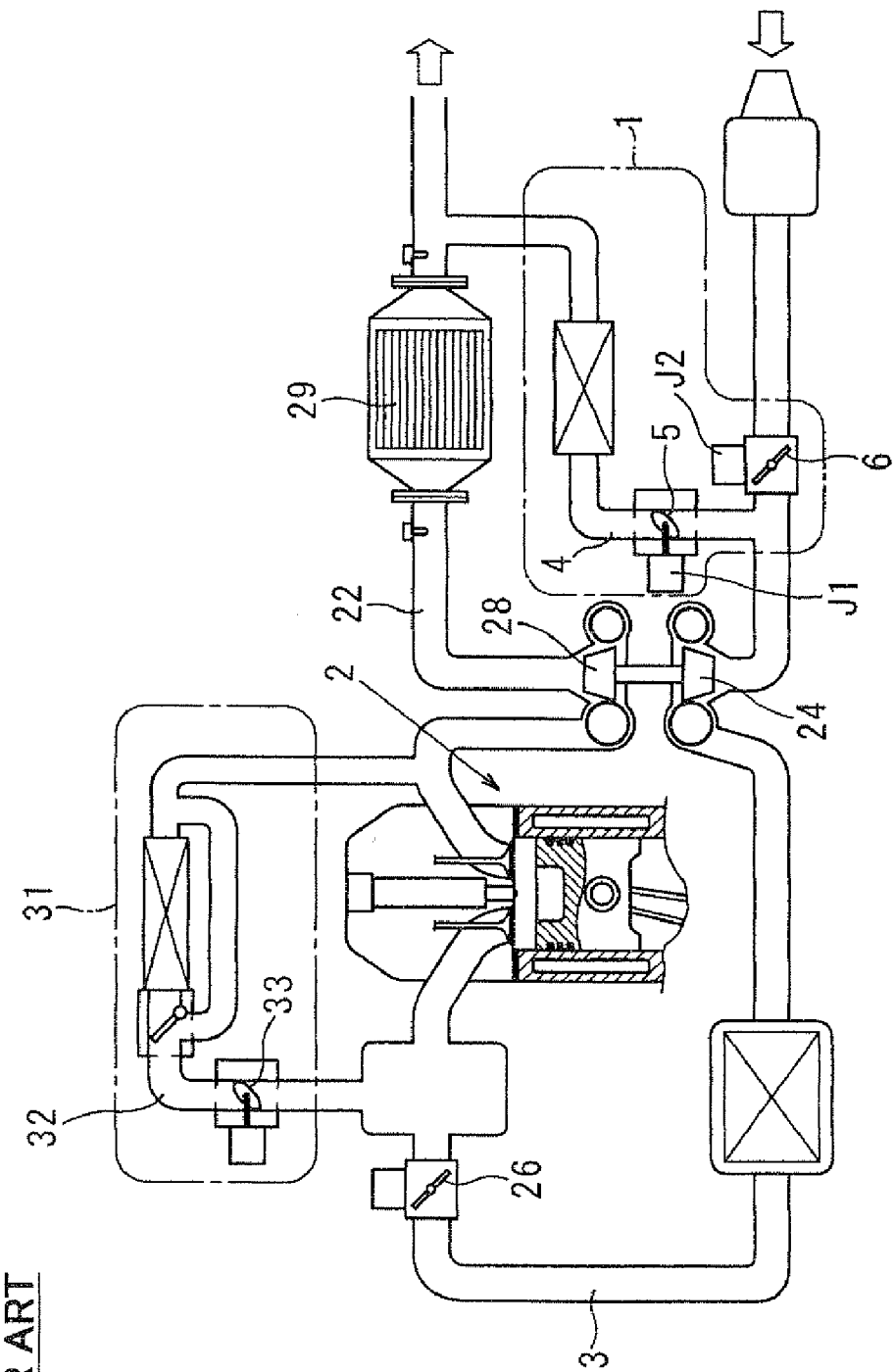
FIG. 14 is a schematic view showing a general structure for an intake and exhaust system for an engine of another prior art.

According to the prior art apparatus (as shown in FIG. 14), therefore, it is necessary to respectively provide the actuator J1 for driving the L-P EGR control valve 5 and the actuator J2 for driving the intake-air valve, which would cause increases in cost, size and weight.

The L-P EGR apparatus 1 according to the first embodiment, which overcomes the above mentioned drawbacks, will be further explained with reference to FIGS. 1 to 5, wherein "UP" and "DOWN" are indicated in FIGS. 1A to 3A only for the purpose of explaining the invention.

A solid line (X) in FIG. 4 shows a relationship between rotational angle of the L-P EGR control valve 5 and opening degree (Q) of the EGR passage 4, while the dotted line (Y) in FIG. 4 shows a relationship between the rotational angle of the L-P EGR control valve 5 and opening degree (Q) of the intake-air passage 3.

In addition to the structure of the L-P EGR apparatus 1 explained above, it further has the electric actuator 7 for driving the L-P EGR control valve 5 and the link device 9 for driving the intake-air valve 6 by converting the output characteristic of the electric actuator 7 via the converting mechanism 8.

The L-P EGR control valve 5 controls the EGR amount by changing its rotational position (the opening degree thereof) in the L-P EGR passage 4, while the intake-air valve 6 likewise changes its rotational position (the opening degree thereof) in the intake-air passage 3. An EGR-valve supporting shaft 41, to which the L-P EGR control valve 5 is fixed, and an intake-air-valve supporting shaft 42, to which the intake-air valve 6 is fixed, are arranged in parallel to each other in a direction of UP-DOWN, as shown in FIGS. 1A to 3A. The supporting shafts 41 and 42 are rotatably supported by bearing members (not shown) in a housing H, which forms a part of the L-P EGR passage 4. As above, rotational axes for the L-P EGR control valve 5 and the intake-air valve 6 are arranged in parallel to each other.

The electric actuator 7 is composed of a well known electric motor which generates rotational driving power upon receiving electric power. The electric actuator 7 is provided at an upper side of the housing H and drives to rotate the EGR-valve supporting shaft 41 as well as the intake-air-valve supporting shaft 42 via the link device 9. In the first embodiment, a DC motor is used as the electric motor, so that control for its rotational angle can be done.

The electric actuator 7 may be composed of solely the electric motor (namely, the EGR-valve supporting shaft 41 may be directly driven by the electric motor), or may be composed of the electric motor and a speed reduction mechanism provided between the electric motor and the EGR-valve supporting shaft 41 (for example, a mechanical reduction gear, so that rotational speed of the electric motor is reduced and such increased torque as a result of the speed reduction is transmitted to the EGR-valve supporting shaft 41).

The link device 9 is arranged at a lower side of the housing H in order to drive the intake-air valve 6 by converting the output characteristic of the electric actuator 7 via the converting mechanism 8. The link device 9 is composed of the cam plate 11 rotated together with the L-P EGR control valve 5 (i.e. driven by the EGR-valve supporting shaft 41) and the arm 12 for driving the intake-air valve 6.

The cam plate 11 is fixed to a lower end of the EGR-valve supporting shaft 41, so that the cam plate 11 is rotated together with the L-P EGR control valve 5. The cam plate 11 is formed in a plate form and made of material having high wear resistance (for example, nylon resin). The cam plate 11 is fixed to the EGR-valve supporting shaft 41 at a right angle thereto.

The arm 12 is fixed to a lower end of the intake-air-valve supporting shaft 42, so that the arm 12 is rotated together with the intake-air valve 6. The arm 12 is formed in a band plate shape and made of material having high wear resistance (for example, nylon resin). The arm 12 is fixed to the intake-air-valve supporting shaft 42 at a right angle thereto, in such a way that a rotating end of the arm 12 overlaps with the cam plate 11 at a predetermined distance in the UP-DOWN direction, as shown in FIGS. 1A to 3A.

The link device 9 further has the lock mechanism 16, with which the intake-air valve 6 is locked to (held at) its maximum valve opening position.

The lock mechanism 16 is composed of the aperture 13 formed in the arm 12, the lock pin 14 which will be engaged with (inserted into) the aperture 13 depending on a rotational position of the arm 12, and the lever 15 for biasing the lock pin 14 toward the arm 12 having the aperture 13.

The aperture 13 formed in the arm 12 is the aperture to be engaged with the lock pin 14 for locking the intake-air valve 6 to the maximum valve opening position. Namely, when the arm 12 is rotated in a valve opening direction (in a clockwise direction in FIGS. 1B to 3B), the lock pin 14 is engaged with (inserted into) the aperture 13 to lock the intake-air valve 6 to the maximum valve opening position thereof.

The lever 15 is made of a blade spring being capable of elastic deformation, and its longitudinal direction coincides with a line connecting a rotational center of the EGR-valve supporting shaft 41 with a rotational center of the intake-air-valve supporting shaft 42. More exactly, the lever 15 extends in a direction from the intake-air-valve supporting shaft 42 to the EGR-valve supporting shaft 41.

The lock pin 14, which will be engaged with the aperture 13 formed in the arm 12, is formed at an intermediate portion of the lever 15. According to the first embodiment, the lock pin 14 is formed in such a way that apart of the spring material for the lever 15 is downwardly protruded. In addition, a sliding end portion 43 is formed at a forward end of the lever 15 (on a side closer to the EGR-valve supporting shaft 41), wherein the sliding end portion 43 is likewise downwardly protruded toward an upper surface of the cam plate 11 so that it is in contact with the upper surface and slides thereon.

The other end (a right-hand end closer to the intake-air-valve supporting shaft 42) of the lever 15 is fixed to the housing H, so that the biasing force is generated at the lever 15 for downwardly biasing the lock pin 14 (toward the aperture 13) as well as the sliding end portion 43 (toward the upper surface of the cam plate 11).

The lever 15 is so designed that the biasing force is slightly applied to the lock pin 14 for biasing the lock pin 14 in the downward direction even after the lock pin 14 is engaged with (inserted into) the aperture 13 (in the locked condition for the intake-air valve 6 at its maximum valve opening position). As a result, a bumpy situation for the lock mechanism 16 can be avoided. In addition, the intake-air valve 6 may be prevented from being vibrated, even when abnormal high pressure pulsation may be generated in the L-P EGR passage 3, because the intake-air valve 6 is firmly locked to its locked condition.

The converting mechanism 8 for converting the output characteristic of the electric actuator 7 is composed of the cam groove 17 formed in the cam plate 11 at a distance from the rotational center thereof and the driving pin 18 provided on the arm 12 at a distance from the rotational center thereof, wherein the driving pin 18 receives the driving force from the cam groove 17 depending on the rotational position of the cam plate 11.

The driving pin 18 is composed of a shaft 44 attached to the arm 12 at a rotating end thereof and extending in the downward direction, and a cylindrical roller 45 rotatably attached to the shaft 44. The roller 45 is one of examples for absorbing difference of rotational speeds. The shaft 44 may be integrally formed with (or separately formed from but attached to) the arm 12.

An outer periphery of the roller 45 may be formed in a barrel shape, so that an intermediate portion is swollen and both side portions are reduced. As a result, even in a case that the cam plate 11 may be slightly inclined relative to the arm 12, the barrel shaped roller 45 may absorb such inclination so that the roller 45 is stably in contact with the cam groove 17.

A cam profile of the cam groove 17 for applying the driving force to the driving pin 18 is formed by two parts of grooves.

Figure 2A:
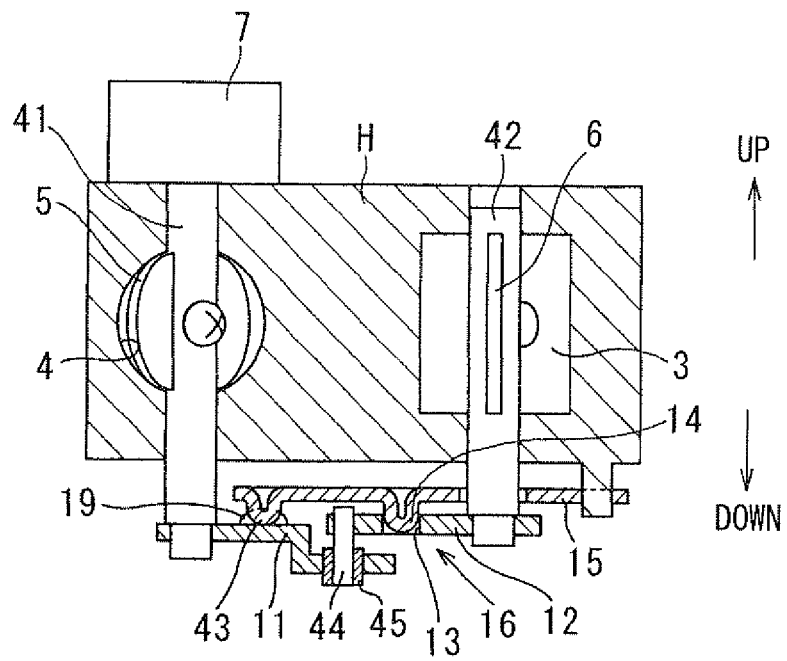
FIGS. 2A to 2C are schematic views similar to those of FIGS. 1A to 1C, wherein the low pressure EGR control valve is rotated by a predetermined angle, while the intake-air valve is held at its initial position (a maximum valve opening position)
Figure 2B:
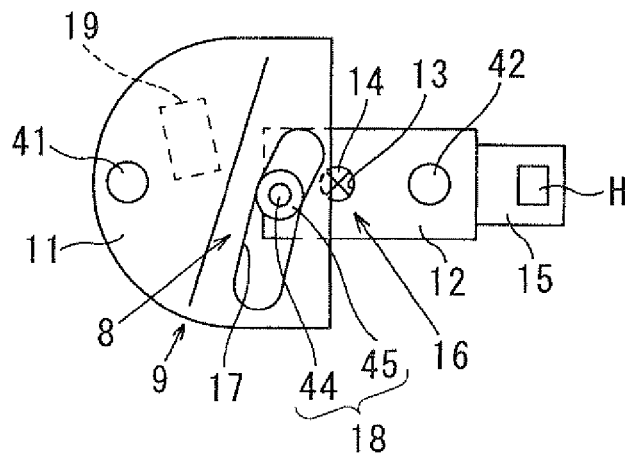
Figure 2C:
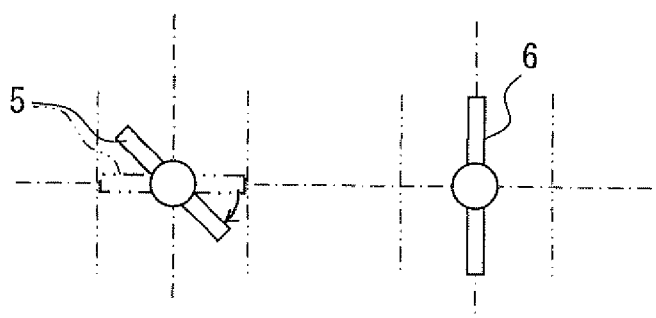
Figure 5A:
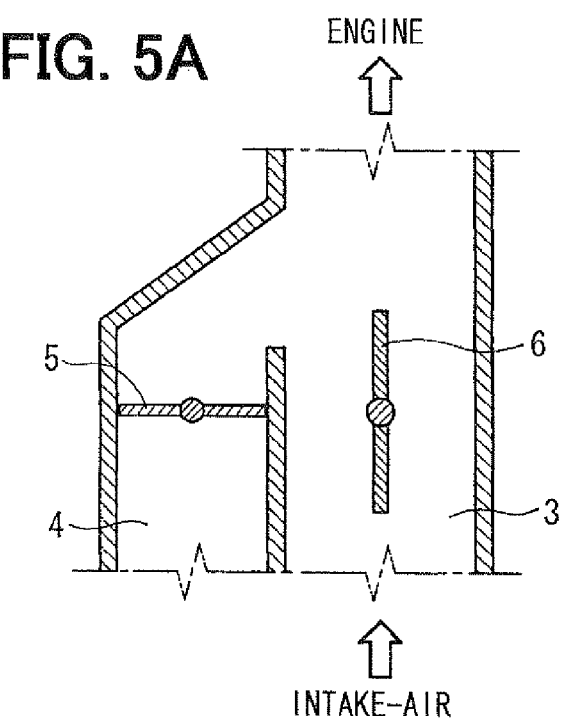
FIGS. 5A to 5C are explanatory views showing respective positions of the low pressure EGR control valve and the intake-air valve in operating modes for "low density control" and "high density control", wherein FIGS. 5A to 5C correspond to the respective valve positions shown in FIGS. 1C to 3C.
Figure 5B:
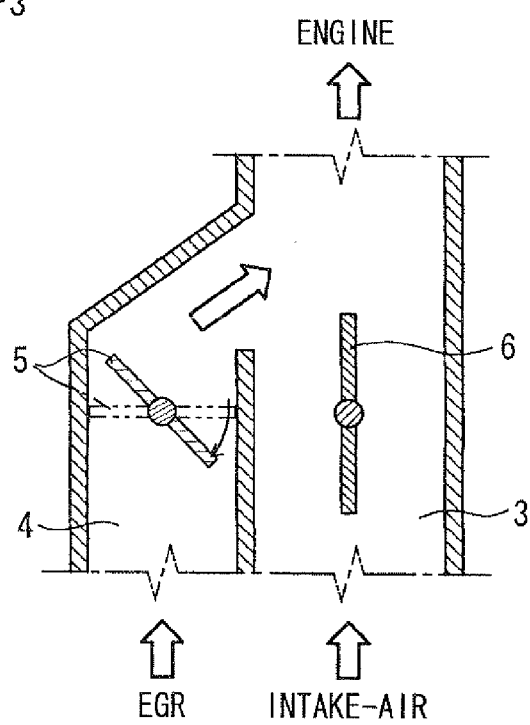
Figure 5C:
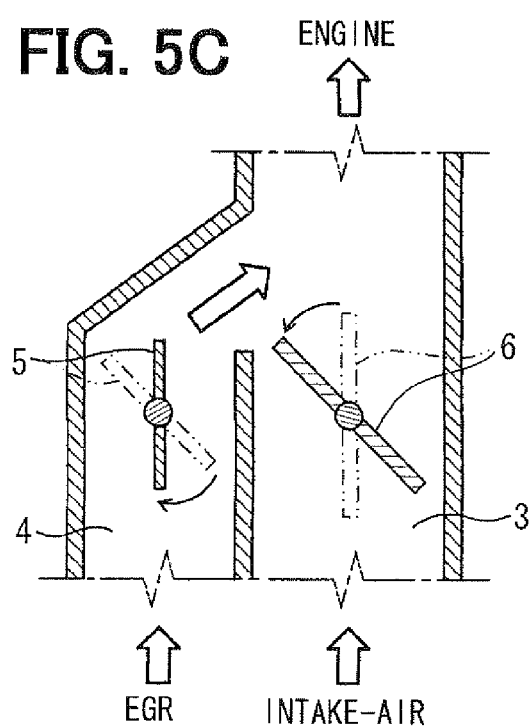

A first part of the groove is formed in an arc shape having a rotational center, which coincides with the rotational center of the cam plate 11. During the cam plate 11 is rotated in the first angular range (0 to Z degree) of the L-P EGR control valve 5 in which the driving pin 18 moves along the first part of the groove (17), namely when the L-P EGR control valve 5 is rotated from its initial valve position (that is, the rotational angle is zero degree, as shown in FIG. 1B, 1C or 5A) to the intermediate valve position (that is, the rotational angle is Z degree, as shown in FIG. 2B, 2C or 58), the intake-air valve 6 is held at its maximum valve opening position (as shown in FIG. 5A or 5B).

A second part of the groove is formed in either an arc shape or a straight shape, in such a way that a distance between the groove and the rotational center of the cam plate 11 is gradually increased as the cam plate 11 is further rotated from the intermediate valve position (from the Z-degree position). Namely, in the second angular range (Z to 90 degree) of the L-P EGR control valve 5, when the L-P EGR control valve 5 is further rotated from the intermediate valve position (FIG. 2B, 2C or 5B) to the maximum valve opening position (FIG. 3B, 3C, or 5C), the arm 12 is rotated together with the rotation of the L-P EGR control valve 5 so that the intake-air valve 6 is rotated in the valve closing direction for the intake-air passage 3 from its initial position (FIG. 5A or 5B) to the maximum valve closing position (FIG. 50).

A lever-lift cam 19 is provided on the upper surface of the cam plate 11, so that a forward end of the lever 15 is lifted up within a certain angular range of the cam plate 11 (that is, the second angular range of Z-to-90 degree of the L-P EGR control valve 5). As a result, the lock pin 14 is brought out of the engagement with the aperture 13. The sliding end portion 43 formed at the forward end of the lever 15 as well as the lever-lift cam 19 formed on the cam plate 11 forms a lock releasing mechanism.

[Operation of Low EGR Density Mode]

An operating mode of low EGR density, in which the smaller amount of the EGR gas is re-circulated into the engine 2 via the L-P EGR apparatus 1, is required when the engine operating condition is in a high load for the engine 2 (for example, when the engine operating condition is in the range above the dotted line "β" in FIG. 7). In the operating mode of the low EGR density, the L-P EGR apparatus 1 is operated by the ECU in the following manner:

(1) At first, the ECU determines whether the intake-air valve 6 is held at the maximum valve opening position. In other words, the ECU determines whether the L-P EGR apparatus 1 is in "the operating mode of low EGR density" or in "the operating mode of high EGR density".

(2) When the ECU determines that the intake-air valve 6 is not held at the maximum valve opening position (namely, when the L-P EGR apparatus 1 is in "the operating mode of high EGR density"), the ECU operates the electric actuator 7 to rotate the L-P EGR control valve 5 so that its rotational angle (i.e. the opening degree for the EGR passage 4) becomes smaller than Z degree. Then, as shown in FIGS. 2A to 2C (or FIG. 5B), the intake-air valve 6 is rotated to the maximum valve opening position, and the lock mechanism 16 locks the intake-air valve 6 at the maximum valve opening position. As a result, the operating mode for the L-P EGR apparatus 1 is changed to "the operating mode of low EGR density".

(3) In the condition that the intake-air valve 6 is locked at the maximum valve opening position (that is, in the condition in which the operating mode for the L-P EGR apparatus 1 is changed to "the operating mode of low EGR density"), the arm 12 is not moved by the cam profile of the cam groove 17 even when the cam plate 11 is rotated in the first angular range of 0 to Z degree for the L-P EGR control valve 5. This means that it is possible to control the EGR amount by rotating the L-P EGR control valve 5 by the electric actuator 7. Namely, as shown in FIG. 5B, the ECU controls to rotate the L-P EGR control valve 5, while the intake-air valve 6 is held at the maximum valve opening position. Accordingly, the smaller amount of the EGR gas can be re-circulated into the engine 2 via the L-P EGR apparatus 1.

[Operation of High EGR Density Mode]

The operating mode of high EGR density, in which the larger amount of the EGR gas is re-circulated into the engine 2 via the L-P EGR apparatus 1, is required when the engine operating condition is in a middle load for the engine 2 (for example, when the engine operating condition is in the range between the dotted lines "a" and "β" in FIG. 7). In the operating mode of the high EGR density, the L-P EGR apparatus 1 is operated by the ECU in the following manner:

(1) At first, the ECU determines whether the intake-air valve 6 is held at the maximum valve opening position. In other words, the ECU determines whether the L-P EGR apparatus 1 is in "the operating mode of low EGR density" or in "the operating mode of high EGR density".

(2) When the ECU determines that the intake-air valve 6 is held at the maximum valve opening position (namely, when the L-P EGR apparatus 1 is in "the operating mode of low EGR density"), the ECU operates the electric actuator 7 to rotate the L-P EGR control valve 5 so that its rotational angle (i.e. the opening degree for the EGR passage 4) becomes larger than Z degree. Then, as shown in FIGS. 3A to 3C (or FIG. 5C), the locked condition for the intake-air valve 6 is released by the lock mechanism 16, and the driving force is transmitted from the cam groove 17 to the arm 12. As a result, the operating mode for the L-P EGR apparatus 1 is changed to "the operating mode of high EGR density".

(3) In the condition that the intake-air valve 6 is released from the locked condition (that is, in the condition in which the operating mode for the L-P EGR apparatus 1 is changed to "the operating mode of high EGR density"), the arm 12 is moved by the cam profile of the cam groove 17 when the cam plate 11 is rotated in the second angular range of Z to 90 degree for the L-PEGR control valve 5.

This means that it becomes possible for the L-P EGR apparatus 1 to control not only the EGR amount by rotating the L-P EGR control valve 5 but also negative pressure generation by rotating the intake-air valve 6 (in a valve closing direction), wherein both of the valves are operated by the electric actuator 7. Namely, as shown in FIG. 5O, the ECU controls to rotate the L-P EGR control valve 5 and the intake-air valve 6 at the same time. Accordingly, the larger amount of the EGR gas can be re-circulated into the engine 2 via the L-P EGR apparatus 1.

According to the above L-P EGR apparatus 1 of the first embodiment, it is possible with one electric actuator 7, (a) to rotate the L-P EGR control valve 5 while keeping the locked condition of the intake-air valve 6 at the maximum valve opening position, so that the smaller amount of EGR gas is re-circulated into the engine 2, and (b) to rotate the L-P EGR control valve 5 and the intake-air valve 6 at the same time, so that the larger amount of EGR gas is re-circulated into the engine 2.

In other words, it is possible with one electric actuator 7 to control both of the L-P EGR control valve 5 and the intake-air valve 6, and to meet both of the characteristic feature required for the L-P EGR control valve 5 and the characteristic feature required for the intake-air valve 6.

Accordingly, it is possible to suppress a possible increase of the cost for the LP EGR apparatus 1 and also to realize a small-sized and light-weight EGR apparatus.

According to the L-P EGR apparatus 1, the EGR-valve supporting shaft 41 and the intake-air-valve supporting shaft 42 are arranged in parallel to each other, and the cam plate 11 and the arm 12 are respectively fixed to the EGR-valve supporting shaft 41 and the intake-air-valve supporting shaft 42 at right angle.

As a result, the structure of the link device 9 having the converting mechanism 8 can be made in a simpler form, and it is easier to assemble and/or inspect for maintaining the reliable operation of the link device 9.

Furthermore, according to the above L-P EGR apparatus 1, the roller 45 is rotatably arranged at the driving pin 18 for transmitting the driving torque from the cam plate 11 to the arm 12, and the outer periphery of the roller 45 is formed in the barrel shape.

As a result, even in the case that the cam plate 11 may be slightly inclined relative to the arm 12, the barrel shaped roller 45 may absorb such inclination so that the roller 45 is stably in contact with the cam groove 17 so as to suppress generation of chattering.

The L-P EGR apparatus 1 according to the first embodiment has the lock mechanism 16, by which the intake-air valve 6 is locked to its maximum valve opening position.

As a result, the intake-air valve 6 may be prevented from being vibrated, even when abnormal high pressure pulsation may be generated in the intake-air passage 3.

Second Embodiment

A second embodiment of the invention will be explained with reference to FIGS. 8A to 8D and FIG. 9. In the drawing, the same reference numerals are used to the same or similar components and/or portions of the first embodiment.

The second embodiment relates to a modification of the control program carried out by the ECU. More exactly, the second embodiment relates to the control program for the operating mode of high EGR density, in which the larger amount of the EGR gas is re-circulated into the engine 2 via the L-P EGR apparatus 1.

According to the control program for high-pressure and/or low-pressure EGR amount, the EGR amount is controlled depending on the opening degree of the intake-air valve 6 from its maximum valve opening position (to the valve closing direction) as well as the opening degree of the L-P EGR control valve 5 from its maximum valve closing position (to the valve opening direction).

An example will be explained with reference to FIGS. 8A to 8D.

Figure 8A:
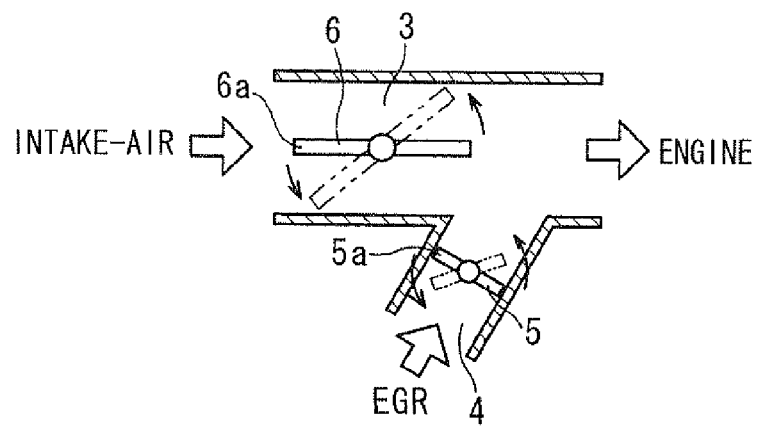
FIGS. 8A to 8D are schematic views respectively showing valve positions of the EGR control valve and the intake-air valve depending on different operating conditions, according to a second embodiment of the invention.
Figure 8B:
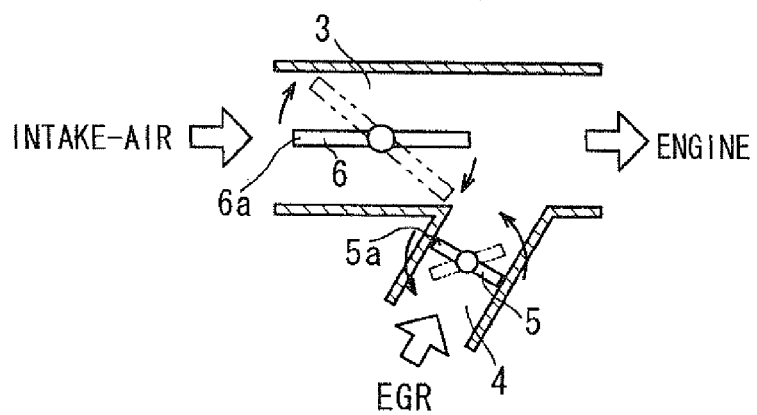
Figure 8C:
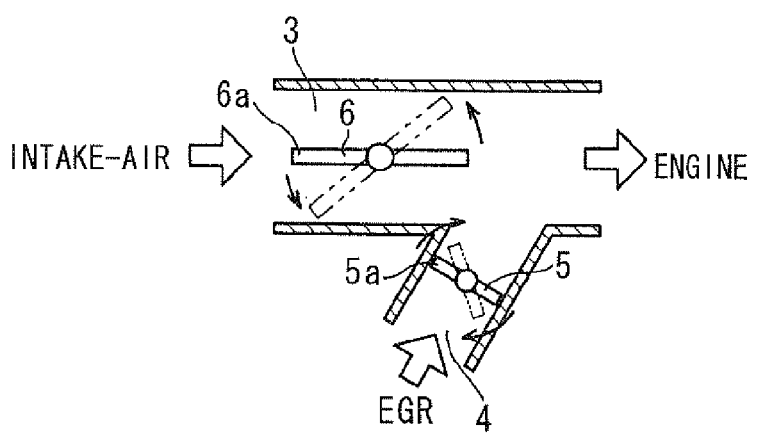
Figure 8D:
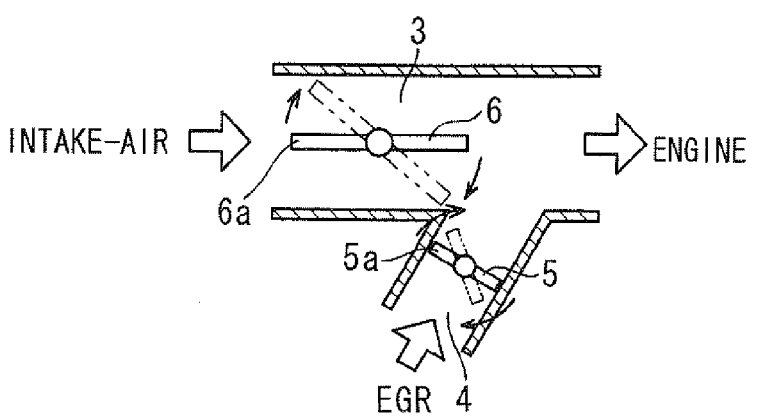

When the intake-air valve 6 is rotated from the maximum valve opening position to the valve closing position, there are two rotational directions:

(1) a first direction: an upstream side 6a of the intake-air valve 6 is moved in a direction coming closer to the L-P EGR control valve 5 as shown in FIG. 8A or 8C, wherein the rotating direction of the intake-air valve 6 is an anti-clockwise direction; and (2) a second direction: the upstream side 6a of the intake-air valve 6 is moved in a direction becoming remote from the L-P EGR control valve 5 as shown in FIG. 8B or 8D, wherein the rotating direction of the intake-air valve 6 is a clockwise direction.

In a similar manner, when the L-P EGR control valve 5 is rotated from the valve closing position to the valve opening position, there are two rotational directions:

(1) a first direction: a side 5a of the L-P EGR control valve 5 (which is closer to the intake-air valve 6) is moved in a direction becoming remote from the intake-air valve 6 as shown in FIG. 8A or 8B, wherein the rotating direction of the L-P EGR control valve 5 is an anti-clockwise direction; and (2) a second direction: the side 5a of the L-P EGR control valve 5 is moved in a direction coming closer to the intake-air valve 6 as shown in FIG. 8C or 8D, wherein the rotating direction of the L-P EGR control valve 5 is a clockwise direction.

Accordingly, there are four combinations (as below) of the rotating directions for the L-P EGR control valve 5 and the intake-air valve 6 as shown in FIGS. 8A to 8D:

A first combination (hereinafter also referred to as a pattern A) is shown in FIG. 8A, in which the intake-air valve 6 is rotated in the anti-clockwise direction (the upstream side 6a coming closer to the EGR control valve 5), while the EGR control valve 5 is also rotated in the anti-clockwise direction (the side 5a becoming remote from the intake-air valve 6).

A second combination (hereinafter also referred to as a pattern B) is shown in FIG. 8B, in which the intake-air valve 6 is rotated in the clockwise direction (the upstream side 6a becoming remote from the EGR control valve 5), while the EGR control valve 5 is rotated in the anti-clockwise direction (the side 5a becoming remote from the intake-air valve 6).

A third combination (hereinafter also referred to as a pattern C) is shown in FIG. 8C, in which the intake-air valve 6 is rotated in the anti-clockwise direction (the upstream side 6a coming closer to the EGR control valve 5), while the EGR control valve 5 is rotated in the clockwise direction (the side 5a coming closer to the intake-air valve 6).

A fourth combination (hereinafter also referred to as a pattern D) is shown in FIG. 8D, in which the intake-air valve 6 is rotated in the clockwise direction (the upstream side 6a becoming remote from the EGR control valve 5), while the EGR control valve 5 is also rotated in the clockwise direction (the side 5a coming closer to the intake-air valve 6).

The EGR amount of the L-P EGR apparatus 1 is different in the following cases:

(1) when the upstream side 6a is moved in the direction coming closer to the EGR control valve 5 (that is, in the anti-clockwise direction: FIGS. 8A and 8C), and (2) when the upstream side 6a is moved in the direction becoming remote from the EGR control valve 5 (that is, in the clockwise direction: FIGS. 8B and 8D).

In a similar manner, the EGR amount of the L-P EGR apparatus 1 is different in the following cases:

(3) when the side 5a of the EGR control valve 5 is moved in the direction becoming remote from the intake-air valve 6 (that is, in the anti-clockwise direction: FIGS. 8A and 82), and (4) when the side 5a of the EGR control valve 5 is moved in the direction coming closer to the intake-air valve 6 (that is, in the clockwise direction: FIGS. 8C and 8D).

Figure 9:
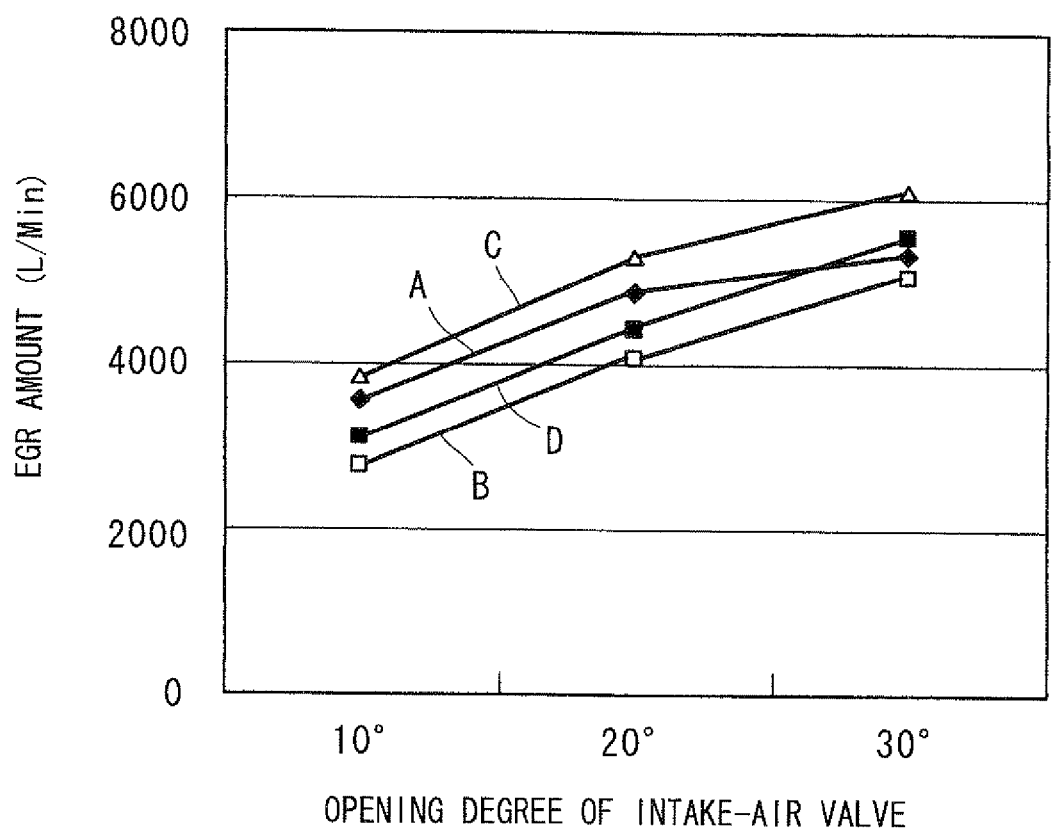
FIG. 9 is a graph showing EGR amount with respect to rotational angle of the intake-air valve.

As above and as shown in FIG. 9, the EGR amount is different from case to case, even when the opening degrees of the EGR control valve 5 and the intake-air valve 6 are the same in those cases, when the valve moving directions of the EGR control valve 5 and the intake-air valve 6 are different as in the above patterns A to D. Reference numerals A to D in FIG. 9 respectively correspond to the above patterns A to D.

Therefore, the ECU controls the operations for the EGR control valve 5 and the intake-air valve 6 in view of the above point, so as to avoid any unfavorable situation in which the EGR amount is changed depending on differences of the valve moving directions.

According to the second embodiment, the pattern C (FIG. 8C) is applied to the L-P EGR apparatus 1 so that the largest EGR amount can be obtained with the same opening degree of the intake-air valve 6. As a result, a decrease of intake-air amount can be suppressed to thereby suppress a possible decrease of engine output.

Third Embodiment

A third embodiment will be explained with reference to FIGS. 10A to 10C.

Figures 10A, 10B, 10C:
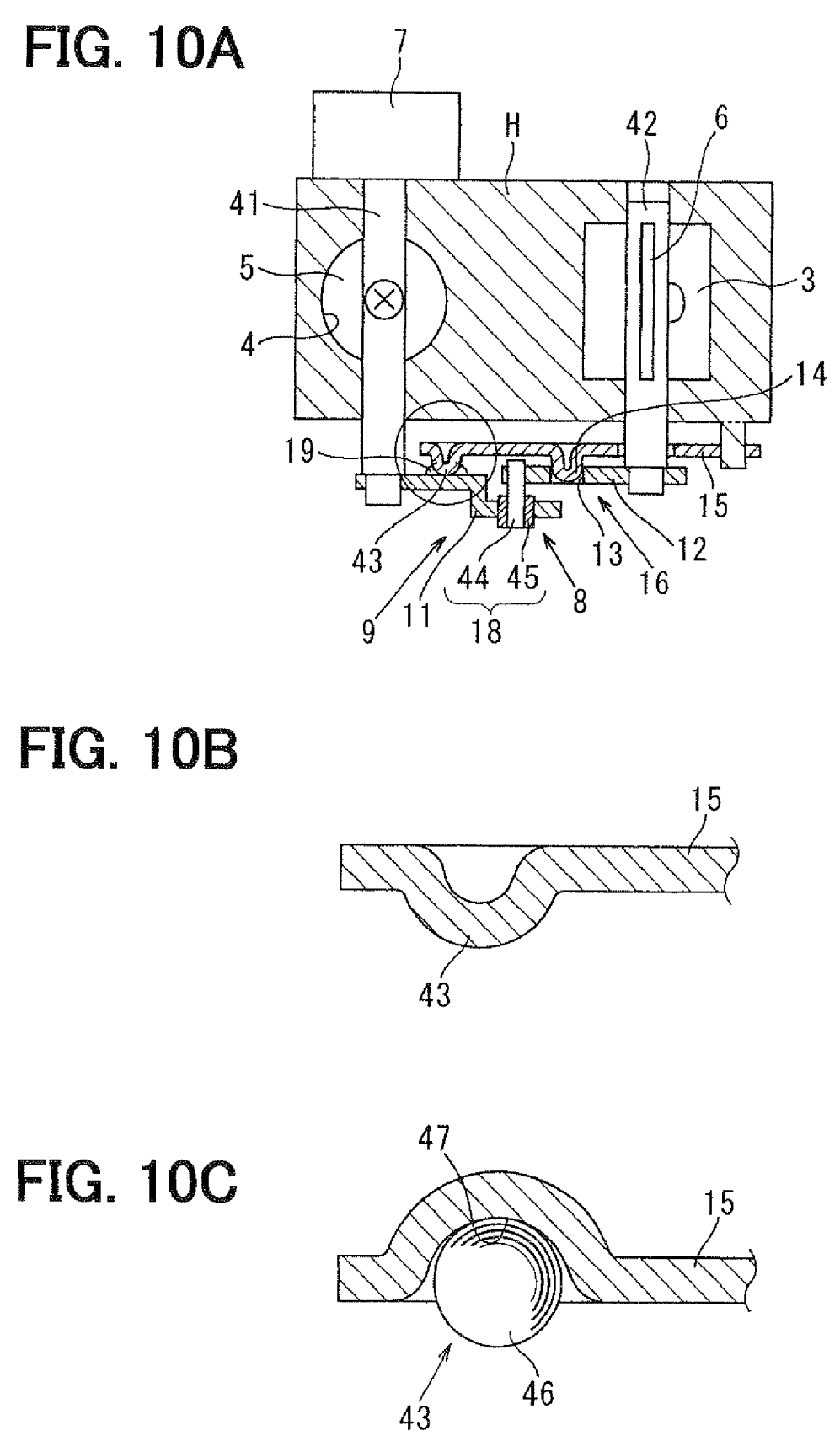

FIG. 10A corresponds to FIG. 1A and a portion encircled in FIG. 10A is shown in FIG. 102 in an enlarged scale. As already explained, the sliding end portion 43 is integrally formed with the lever 15 according to the first embodiment. More exactly, the sliding end portion 43 is formed at the forward end of the lever 15 in such a way that it is formed in a hemispherical protrusion protruding in the downward direction toward the cam plate 11.

According to the third embodiment, as shown in FIG. 10C, a ball 46 is used as the sliding end portion 43. More exactly, a hemispherical projection 47 is formed at the forward end of the lever 15, which is projected in the upward direction (in the direction opposite to the cam plate 11), and the ball 46 is rotatably arranged in an inside of the projection 47 so that the ball 46 forms the sliding end portion 43.

As a result, contact resistance between the cam plate 11 and the sliding end portion 43 can be made smaller to thereby suppress wear of the cam plate 11.

Fourth Embodiment

Figure 11:
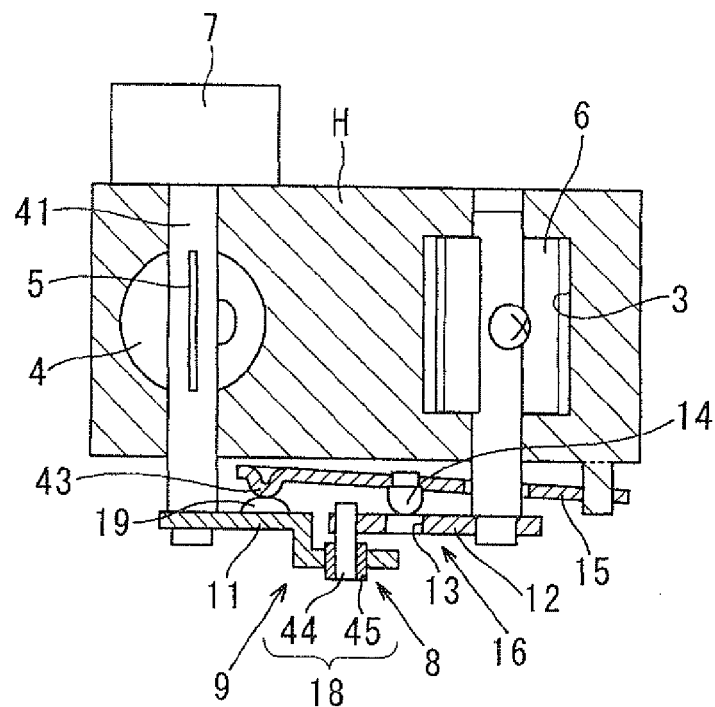
FIG. 11 is a schematic cross-sectional view showing a driving mechanism for a low pressure EGR control valve and an intake-air valve according to a fourth embodiment of the invention.

A fourth embodiment of the invention will be explained with reference to FIG. 11.

According to the first embodiment, the lock pin 14 is integrally formed in the lever 15. More exactly, the lock pin 14 is formed at the intermediate portion of the lever 15 in a semi-spherical shape in such a way that the part of the spring material for the lever 15 is downwardly protruded (to a side of the cam plate).

According to the fourth embodiment, the lock pin 14 is made as a separate member and fixed to the lever 15.

Fifth Embodiment

Figure 12:
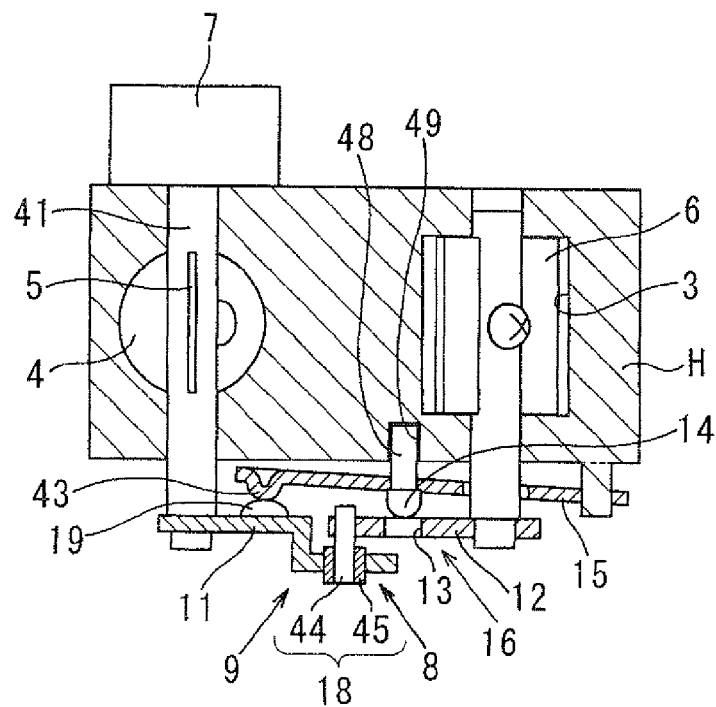
FIG. 12 is a schematic cross-sectional view showing a driving mechanism for a low pressure EGR control valve and an intake-air valve according to a fifth embodiment of the invention.
Figure 13:
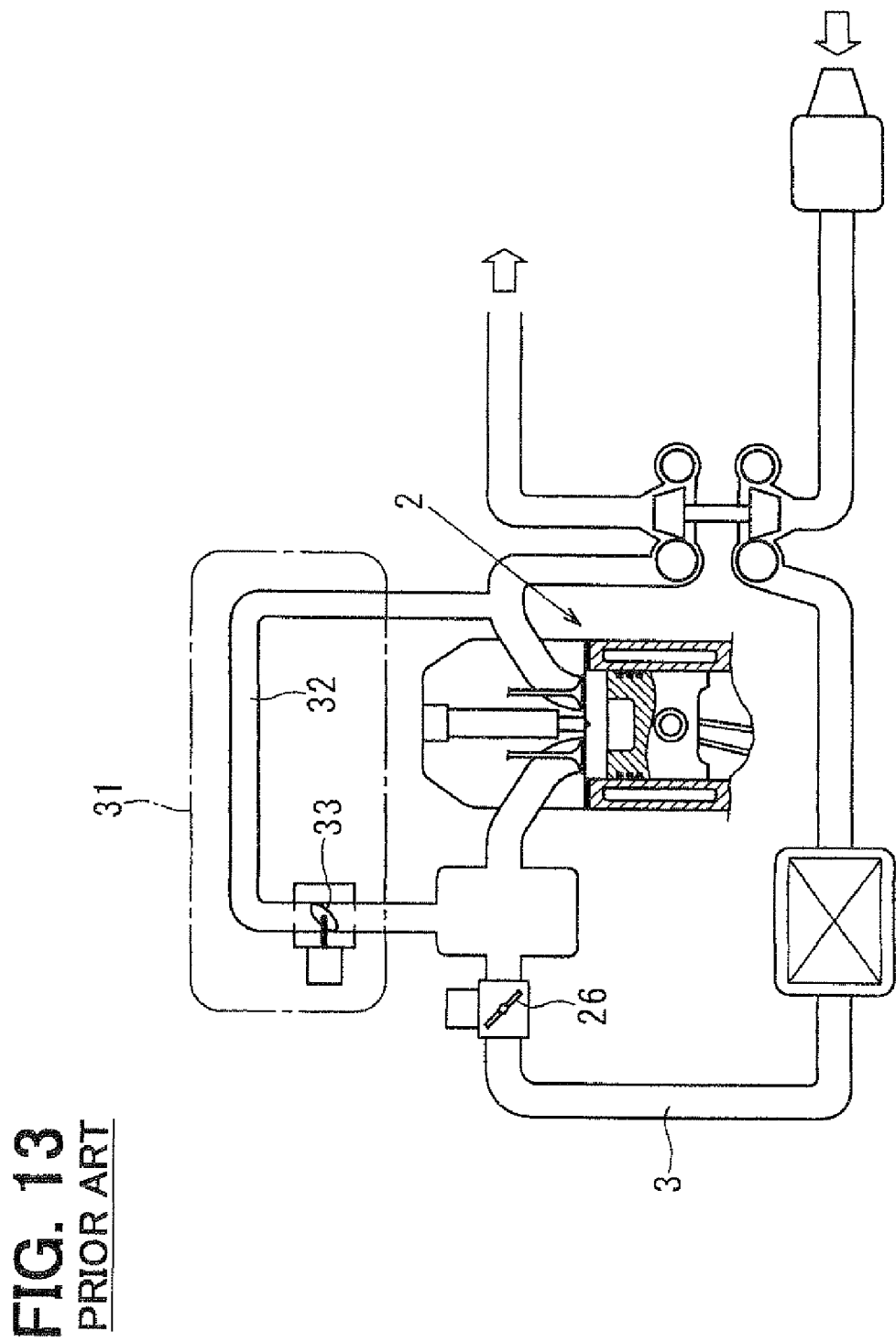
FIG. 13 is a schematic view showing a general structure for an intake and exhaust system for an engine of a prior art.

A fifth embodiment of the invention will be explained with reference to FIG. 12.

According to the above embodiments, the lock pin 14 is integrally formed with or fixed to the lever 15 so that the lock pin 14 extends only in the downward direction.

According to the fifth embodiment, a guide shaft 48 extending in the upward direction is provided to the lock pin 14 extending in the downward direction. A guide hole 49 is formed at the housing H, so that the guide shaft 48 is slidably inserted into the guide hole 49.

As a result that the guide shaft 48 is slidably inserted into the guide hole 49 formed in the housing H, a lateral movement of the lock pin 14 can be prevented so that the intake-air valve 6 can be firmly held at its locked position (the maximum valve opening position).

Accordingly, the intake-air valve 6 may be prevented from being vibrated even when abnormal high pressure pulsation may be generated in the EGR passage 3.

In the above embodiments, the present invention is applied to the intake and exhaust systems of the engine 2 having the turbo charger. The present invention may be applied to other types of the engine, namely to an intake and exhaust system of an engine having a super charger in place of the turbo charger, or to an intake and exhaust system of an engine having no turbo charger or no super charger.

When the present invention is applied to the engine having the super charger, a low negative pressure portion in an intake-air passage is a portion of the intake-air passage at an upstream side of a compressor. On the other hand, when the present invention is applied to the engine having no super charger, the low negative pressure portion in the intake-air passage is a portion of the intake-air passage at an upstream side of a throttle valve.

In the above embodiments, the present invention is applied to the intake and exhaust systems of the diesel engine. The present invention may be applied to other types of engines (for example, a gasoline engine) than the diesel engine.

In the above embodiments, the roller 45 is used as one of examples for absorbing difference of rotational speeds. However, such a ball bearing may be used, wherein an outer race thereof may absorb an inclination of the cam plate 11 (a relative inclination between the cam plate 11 and the arm 12).

What is claimed is:

1. A low pressure EGR apparatus for an engine comprising:
a low pressure EGR passage for re-circulating a part of exhaust gas from the engine into a low negative pressure portion of an intake-air passage of the engine as EGR gas;
a low pressure EGR control valve provided in the low pressure EGR passage for controlling EGR gas amount by adjusting an opening degree of the low pressure EGR control valve;
an intake-air valve provided in the intake-air passage at an upstream side of a connecting portion between the low pressure EGR passage and the intake-air passage, for controlling intake-air amount by adjusting an opening degree of the intake-air valve;
an actuator for driving the low pressure EGR control valve; and
a link device having a converting mechanism for converting an output characteristic of the actuator, wherein the link device drives the intake-air valve by an output converted through the converting mechanism, wherein
the low pressure EGR apparatus controls EGR amount depending on a rotational direction of the intake-air valve from its maximum valve opening position to a valve closing position as well as a rotational direction of the low pressure EGR control valve from its maximum valve closing position to a valve opening position,
the low pressure EGR control valve controls the EGR amount by changing its rotational angle,
the intake-air valve controls negative pressure generated at a downstream side of the intake-air valve by changing its rotational angle,
valve supporting shafts for the low pressure EGR control valve and the intake-air valve are arranged in parallel to each other,
the link device has a cam plate rotating together with the low pressure EGR control valve and an arm rotating together with the intake-air valve, wherein the cam plate and the arm are operatively connected with each other via the converting mechanism, and
the cam plate and the arm are respectively fixed to the valve supporting shafts for the cam plate and the arm at right angle.

2. A low pressure EGR apparatus for an engine comprising:
a low pressure EGR passage for re-circulating a part of exhaust gas from the engine into a low negative pressure portion of an intake-air passage of the engine as EGR gas;
a low pressure EGR control valve provided in the low pressure EGR passage for controlling EGR gas amount by adjusting an opening degree of the low pressure EGR control valve;
an intake-air valve provided in the intake-air passage at an upstream side of a connecting portion between the low pressure EGR passage and the intake-air passage, for controlling intake-air amount by adjusting an opening degree of the intake-air valve;
an actuator for driving the low pressure EGR control valve; and
a link device having a converting mechanism for converting an output characteristic of the actuator, wherein the link device drives the intake-air valve by an output converted through the converting mechanism, wherein
the low pressure EGR apparatus controls EGR amount depending on a rotational direction of the intake-air valve from its maximum valve opening position to a valve closing position as well as a rotational direction of the low pressure EGR control valve from its maximum valve closing position to a valve opening position,
the low pressure EGR control valve controls the EGR amount by changing its rotational angle,
the intake-air valve controls negative pressure generated at a downstream side of the intake-air valve by changing its rotational angle,
valve supporting shafts for the low pressure EGR control valve and the intake-air valve are arranged in parallel to each other,
the converting mechanism has:
a cam groove formed in the cam plate at a distance from a rotating center thereof, and
a driving pin provided in the arm at a distance from a rotating center thereof and operatively engaged with the cam groove for receiving a driving force from the cam groove, and
the arm and the intake-air valve are rotated by the driving force received by the driving pin.

3. The low pressure EGR apparatus according to the claim 2, wherein
the driving pin has a rotatable member for absorbing differences of rotational speeds, the rotatable member being rotatably supported by the arm, and
the rotatable member is composed of a roller having an outer periphery, which is formed in a barrel shape so that an intermediate portion thereof is swollen and both side portions thereof are reduced, or the rotatable member is composed of a ball bearing having an outer race which absorbs a relative inclination between the arm and the cam plate.

4. A low pressure EGR apparatus for an engine comprising:
a low pressure EGR passage for re-circulating a part of exhaust gas from the engine into a low negative pressure portion of an intake-air passage of the engine as EGR gas;
a low pressure EGR control valve provided in the low pressure EGR passage for controlling EGR gas amount by adjusting an opening degree of the low pressure EGR control valve;
an intake-air valve provided in the intake-air passage at an upstream side of a connecting portion between the low pressure EGR passage and the intake-air passage, for controlling intake-air amount by adjusting an opening degree of the intake-air valve;
an actuator for driving the low pressure EGR control valve; and
a link device having a converting mechanism for converting an output characteristic of the actuator, wherein the link device drives the intake-air valve by an output converted through the converting mechanism, wherein
the low pressure EGR apparatus controls EGR amount depending on a rotational direction of the intake-air valve from its maximum valve opening position to a valve closing position as well as a rotational direction of the low pressure EGR control valve from its maximum valve closing position to a valve opening position,
the link device has:
  a cam plate rotating together with the low pressure EGR control valve,
  an arm rotating together with the intake-air valve, and
  a lock mechanism,
the lock mechanism has:
  a lock pin which will be engaged with an aperture formed in the arm when the intake-air valve is at its maximum valve opening position, and
  a lever for biasing the lock pin toward the arm,
the converting mechanism has:
  a cam groove formed in the cam plate at a distance from a rotating center thereof, and
  a driving pin provided in the arm at a distance from a rotating center thereof and operatively engaged with the cam groove for receiving a driving force from the cam groove,
a cam profile of the cam groove is formed in such a shape that the intake-air valve is held at the maximum valve opening position in a first angular range of the low pressure EGR control valve, wherein the low pressure EGR control valve is rotated from its maximum valve closing position to a predetermined valve opening position, while the intake-air valve is rotated from the maximum valve opening position to a valve closing position for the intake-air passage in a second angular range of the low pressure EGR control valve, wherein the low pressure EGR control valve is rotated from the predetermined valve opening position to its maximum valve opening position, and
a lever-lift cam is formed in the cam plate for pushing the lever so as to bring the lock pin out of engagement with the aperture only when the low pressure EGR control valve is in the second angular range.

* * * * *